(12) United States Patent
Hill et al.

(10) Patent No.: US 7,190,790 B1
(45) Date of Patent: Mar. 13, 2007

(54) MULTIPLE MODULE ENCRYPTION METHOD

(75) Inventors: Michael John Hill, Coppet (CH); Marco Sasselli, Chardonne (CH); Christophe Nicolas, Préverenges (CH)

(73) Assignee: NagraCard S.A. (CH)

(*) Notice: Subject to any disclaimer, the term of this patent is extended or adjusted under 35 U.S.C. 154(b) by 621 days.

(21) Appl. No.: 10/069,714

(22) PCT Filed: Aug. 24, 2000

(86) PCT No.: PCT/IB00/01157

§ 371 (c)(1), (2), (4) Date: Apr. 26, 2002

(87) PCT Pub. No.: WO01/17159

PCT Pub. Date: Mar. 8, 2001

(30) Foreign Application Priority Data

Aug. 30, 1999 (CH) .................................. 1573/99

(51) Int. Cl. *H04K 1/02* (2006.01)

(52) U.S. Cl. .................. 380/44; 380/37; 380/42; 380/28; 380/29; 380/30; 380/232; 380/277; 713/168

(58) Field of Classification Search .............. 380/232, 380/277, 37, 42, 44, 28–30; 705/41, 71–76; 713/160–200; 711/40–45
See application file for complete search history.

(56) References Cited

U.S. PATENT DOCUMENTS

| | | | | |
|---|---|---|---|---|
| 5,365,589 A | * | 11/1994 | Gutowitz | 380/43 |
| 5,548,648 A | * | 8/1996 | Yorke-Smith | 713/193 |
| 5,594,797 A | | 1/1997 | Seppo et al. | |
| 5,742,686 A | * | 4/1998 | Finley | 380/28 |
| 5,748,782 A | * | 5/1998 | Ferreira et al. | 382/232 |
| 5,768,390 A | * | 6/1998 | Coppersmith et al. | 380/42 |
| 5,901,303 A | * | 5/1999 | Chew | 711/115 |
| 5,933,501 A | * | 8/1999 | Leppek | 380/259 |
| 6,128,735 A | * | 10/2000 | Goldstein et al. | 713/166 |
| 6,240,183 B1 | * | 5/2001 | Marchant | 380/28 |
| 6,278,783 B1 | * | 8/2001 | Kocher et al. | 380/277 |
| 6,298,442 B1 | * | 10/2001 | Kocher et al. | 713/194 |
| 6,330,675 B1 | * | 12/2001 | Wiser et al. | 713/189 |
| 6,510,518 B1 | * | 1/2003 | Jaffe et al. | 713/168 |

FOREIGN PATENT DOCUMENTS

DE  19539700 C  11/1996

OTHER PUBLICATIONS

Menezes, Van Orschot, Vanstone. Hand Book of Applied Cryptography, 1997, CRC Press, 5th Edition, 283-291.*
Merkle, Exis int., Hellman, On the Security of Multiple Encryption, Jul. 1981, ACM, vol. 24.*
Renzy, M. et al. *A Block Cipher Method Using Combinations of Different Methods Under the Control of the User Key*, Proceedings of the Workshop on the Theory and Application of Cryptographic Techniques, DE, Berlin, Springer, vol. conf. 3, p. 532-534.

* cited by examiner

*Primary Examiner*—Taghi T. Arani
(74) *Attorney, Agent, or Firm*—Woodard, Emhardt, Moriarty, McNett & Henry LLP

(57) ABSTRACT

The present invention proposes an encryption/decryption method able to resist against various attack strategies such as Simple Power Analysis, Timing Analysis or Differential Power Analysis. The method is carried out by a plurality of encryption/decryption modules arranged in series, wherein an encryption/decryption module, different from the first module, starts encryption/decryption operations as soon as said module receives a part of the results of encryption/decryption operations from the immediately preceding encryption/decryption module.

20 Claims, 2 Drawing Sheets

MULTIPLE MODULE ENCRYPTION METHOD

FIELD OF THE INVENTION

The present invention relates to the domain of the encipherment, or encryption, and the decipherment or decryption of data, and particularly of data, which is to remain inaccessible to unauthorized persons or appliances within the framework of pay-per-view television systems. In such systems, the data are enciphered in a secure environment, which accommodates considerable computational power, and is called the encoding subsystem. The data are then sent, by known means, to at least one decentralized subsystem where they are deciphered, generally by means of an IRD (Integrated Receiver Decoder) and with the aid of a chip card. A possibly unauthorized person can gain unrestricted access to this chip card and the decentralized subsystem, which cooperates with it.

BACKGROUND OF THE INVENTION

It is known practice to chain together various encryption/decryption means in an enciphering/deciphering system. In all of what follows, the expression encryption/decryption will be used to refer to a particular encryption means used in a bigger enciphering/deciphering system.

It has long been sought to optimize the operation of these systems from the triple viewpoint of speed, memory space occupied and security. Speed is understood to mean the time required to decipher the data received.

Encryption/decryption systems with symmetric keys are known. Their inherent security can be gauged as a function of several criteria.

The first criterion is that of physical security, relating to the ease or to the difficulty of a method of investigation by extracting certain components, this being followed by their possible replacement by other components. These replacement components, intended to inform the unauthorized person about the nature and manner of operation of the enciphering/deciphering system, are chosen by him/her in such a way as not to be detected, or to be as undetectable as possible, by the remainder of the system.

A second criterion is that of system security, within the framework of which attacks are not intrusive from the physical viewpoint but call upon analysis of mathematical type. Typically, these attacks will be conducted by computers of high power, which will attempt to break the algorithms and the enciphering codes.

Means of encryption/decryption with symmetric keys are for example the systems referred to as DES (Data Encryption Standard). These relatively old means now merely offer system security and physical security which are entirely relative. It is for this reason in particular that increasingly, DES, the lengths of whose keys are too small to satisfy the conditions of system security, is being replaced by new means of encryption/decryption or with longer keys. Generally, these means having symmetric keys call upon algorithms comprising enciphering rounds.

Other attack strategies are referred to as Simple Power Analysis and Timing Analysis. In Simple Power Analysis, one uses the fact that a microprocessor tasked with encrypting or decrypting data is connected to a voltage source (in general 5 volts). When it is idle, a fixed current of magnitude i flows through it. When it is active, the instantaneous magnitude i is dependent, not only on the incoming data, but also on the encryption algorithm. Simple Power Analysis consists in measuring the current i as a function of time. The type of algorithm, which the microprocessor is performing can be deduced from this.

In the same way, the method of Timing Analysis consists in measuring the duration of computation as a function of a sample presented to the decryption module. Thus, the relationship between the sample presented and the time for computing the result makes it possible to retrieve the decryption module secret parameters such as the key. Such a system is described for example in the document <<Timing Attacks on Implementations of Diffie-Hellman, RSA, DSS, and Other Systems>> published by Paul Kocher, Cryptography Research, 870 Market St, Suite 1088, San Francisco, Calif.-USA.

To improve the security of the enciphering system, algorithms having asymmetric keys have been proposed, such as the so-called RSA (Rivest, Shamir and Adleman) systems. These systems comprise the generation of a pair of matched keys, one the so-called public key serving in the enciphering, and the other the so-called private key serving in the deciphering. These algorithms exhibit a high level of security, both system and physical security. They are on the other hand slower than the traditional systems, especially at the enciphering stage.

The most recent attack techniques call upon the so-called DPA concept, standing for Differential Power Analysis. These methods are based on suppositions, verifiable after a large number of trials, about the presence of a 0 or a 1 in a given position of the enciphering key. They are almost non-destructive, thus rendering them largely undetectable, and call upon both a physical intrusion component and a mathematical analysis component. Their manner of operation recalls the techniques for investigating oil fields, where an explosion of known power is generated at the surface and where earphones and probes, placed at likewise known distances from the site of the explosion, enable assumptions to be made about the stratigraphic composition of the subsurface without having to carry out too much digging, by virtue of the reflecting of the shock waves by the boundaries of sedimentary beds in this subsurface. DPA attacks are described in particular in § 2.1. of the document <<A Cautionary Note Regarding Evaluation of AES Candidates on Smart-Cards>>, published on 1st Feb. 1999 by Suresh Chari, Charanjit Jutla, Josyula R. Rao and Pankaj Rohatgi, of IBM T. J. Watson Research Center, Yorktown Heights, N.Y.

The requirement of having to resist DPA attacks forces the use of so-called <<whitening>> jamming systems, either in the input information, or at the output of an enciphering/deciphering algorithm. The technique of whitening is described in § 3.5 of the same aforesaid document.

Moreover, the fact that the computation powers are limited in the decentralized subsystem of a pay-per-view television system creates a problem, which has never yet been satisfactorily solved, for performing the chaining described previously to a sufficient extent.

SUMMARY OF THE INVENTION

The objective of the present invention is to make available an encryption/decryption method which is resistant to modern methods of investigation such as described above.

This objective is achieved by a method of encryption and decryption carried out by a plurality of encryption/decryption modules arranged in series, wherein an encryption/decryption module, different from the first module, starts encryption/decryption operations as soon as said module receives a part of the results of encryption/decryption operations from the immediately preceding encryption/decryption module.

The particular feature of the method lies in the fact that an intermediate module does not start up when the result from the previous (or upstream) module has terminated but begins as soon as already part of the information is available. Therefore, for an outside observer, it is not possible to establish the input or output conditions for this module.

Since the deciphering occurs in the decentralized subsystem cooperating with the chip card, this chip card accommodating only relatively limited computational powers as compared with the encoding subsystem, it is for example beneficial to use a public asymmetric key, operating relatively fast, during the last steps of the deciphering. This makes it possible on the one hand to preserve the invulnerability characteristics of the system on exiting the procedure, and on the other hand to concentrate the computational power, related essentially to encipherment with the aid of the private key, in the encoding subsystem.

It has been discovered that extra security is afforded by the possibility of concatenating, or of partially interleaving, two means of encryption/decryption which follow one another sequentially. This concatenation or partial interleaving is understood to mean the process consisting in starting the action of the second encryption/decryption means on the data at a moment when the first encryption/decryption means has not yet terminated its work on these same data. This makes it possible to mask the data such as they would result from the work of the first module and before they are subjected to the action of the second module.

The chaining can start as soon as data computed at the output of the first module are partially available for processing by the second module.

The invention makes it possible to guard against the aforesaid attacks by combining various means of encryption/decryption in an enciphering/deciphering system, and possibly by associating concatenation or partial interleaving with the sequence in which these means follow one another.

BRIEF DESCRIPTION OF THE DRAWINGS

The present invention will be understood in greater detail by virtue of the following drawings, taken by way of non-limiting example, in which.

DETAILED DESCRIPTION OF THE INVENTION

Figure 1:
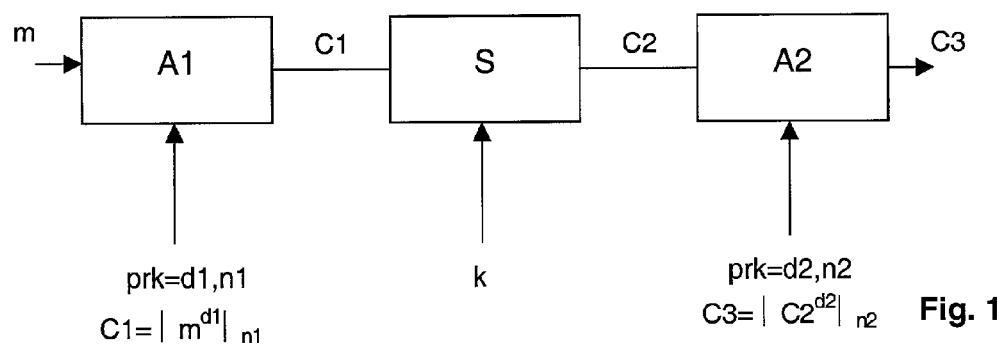
FIG. 1 represents the encryption operations

In a particular embodiment of the invention, the enciphering/deciphering system comprises an encoding subsystem where three algorithms are used sequentially:

a) an asymmetric algorithm A1 with private key d1. This algorithm A1 performs a signature on plain data, represented by a message m, this operation delivering a first cryptogram c1, by means of mathematical operations which are generally denoted in the profession by the formula: c1=m exponent d1, modulo n1. In this formula, n1 forms part of the public key of the asymmetric algorithm A1, modulo represents the well-known mathematical operator of congruencies within the set of relative integers, and d1 is the private key of the algorithm A.

b) a symmetric algorithm S using a secret key K. This algorithm converts the cryptogram c1 into a cryptogram c2.

c) an asymmetric algorithm A2 with private key d2. This algorithm A2 converts the cryptogram c2 into a cryptogram c3, by means of the mathematical operation denoted, as previously, by: c3=c2 exponent d2 mod n2, in which formula n2 forms part of the public key of the asymmetric algorithm A2, and d2 is the private key of the algorithm A2.

The cryptogram c3 leaves the encoding subsystem and arrives at the decentralized subsystem by means known per se. In the case of pay-per-view television systems, this may equally involve video data or messages.

The decentralized subsystem uses, in the order reverse to the above, three algorithms A1', S' and A2'. These three algorithms form part of three encryption/decryption means A1–A1', S–S' and A2–A2', distributed between the encoding subsystem and the decentralized subsystem, and representing the encryption/decryption system.

d) the algorithm A2' performs a mathematical operation on c3 which restores c2 and is denoted: c2=c3 exponent e2 mod n2. In this formula, the set consisting of e2 and n2 is the public key of the asymmetric algorithm A2–A2'.

e) the symmetric algorithm S' using the secret key K restores the cryptogram c1.

f) the asymmetric algorithm A1' with public key e1, n1 retrieves m by performing the mathematical operation denoted: m=c1 exponent e1 mod n1.

The concatenation, in the decentralized subsystem, consists in starting the decoding step e) whilst c2 has not yet been completely restored by the previous step d), and in starting the decoding step f) whilst c1 has not been completely restored by step e. The advantage is to thwart an attack aimed for example firstly at extracting, within the decentralized subsystem, the cryptogram c1 at the end of step e, so as to compare it with the plain data m, then by means of c1 and of m to attack the algorithm A1', and then gradually to backtrack up the coding chain.

The concatenation is not necessary in the encoding subsystem, which is installed in a secure physical environment. It is on the other hand useful in the decentralized subsystem. In the case of pay-per-view television, the IRD is in fact installed at the subscriber's premises and may be the subject of attacks of the pre-described type.

It will be appreciated that an attack of a combination of three concatenated decryption algorithms A1', S' and A2' has much less chance of succeeding than if the cryptograms c1 and c2 are fully reconstructed between each step d), e) and f). Moreover, the fact that the algorithms A1' and A2' are used with public keys e1, n1 and e2, n2 implies that the means of computation required in the decentralized subsystem are much reduced as compared with those in the encoding subsystem.

By way of example and to fix matters, steps a) and c), that is to say the encryption steps with private keys, are 20 times longer than the decryption steps d) and f) with public keys.

In a particular embodiment of the invention, derived from the previous one, the algorithms A1 and A2 are identical as are their counterparts A1' and A2'.

In a particular embodiment of the invention, also derived from the previous one, in step c) the public key e2, n2 of the asymmetric algorithm A2 is used whilst in step d) the cryptogram c3 is decrypted with the private key d2 of this algorithm. This embodiment constitutes a possible alternative when the resources of the decentralized subsystem in terms of computational power are far from being attained.

Although chip cards are used chiefly for decrypting data, there are also chip cards having the capacities required to perform encryption operations. In this case, the attacks described above will pertain also to these encryption cards which operate away from protected locations such as a management center. This is why the method according to the invention applies also to serial encryption operations, that is to say that the downstream module begins its encryption operation as soon as part of the information delivered by the upstream module is available. This process has the advantage of interleaving the various encryption modules, and as a consequence the result from the upstream module is not completely available at a given time. Moreover, the downstream module does not begin its operations with a complete result but on parts, thereby making it impracticable to interpret the manner of operation of a module with respect to a known input state or output state.

In FIG. 1, a data set m is introduced into the encryption chain. A first element A1 performs an encryption operation using the so-called private key, composed of the exponent d1 and of the modulo n1. The result of this operation is represented by C1. According to the mode of operation of the invention, as soon as part of the result C1 is available, the next module begins its operation. This next module S performs its encryption operation with a secret key. As soon as it is partially available the result C2 is transmitted to the module A2 for the third encryption operation using the so-called private key composed of the exponent d2 and of the modulo n2. The final result, here dubbed C3, is ready to be transmitted by known pathways such as over the airwaves or by cable.

Figure 2:
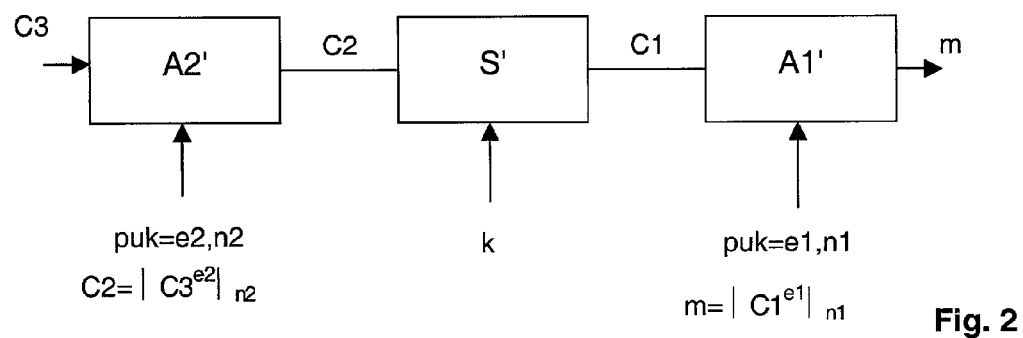
FIG. 2 represents the decryption operations

FIG. 2 represents the decryption system composed of the three decryption modules A1' S', A2' which are similar to those which served for encryption, but are ordered in reverse. Thus, one commences firstly with the module A2' which performs its decryption operation on the basis of the so-called public key composed of the exponent e2 and of the modulo n2. In the same way as for encryption, as soon as part of the result C2 from the module A2' is available, it is transmitted to the module S' for the second decryption operation. To terminate decryption, the module A1' performs its operation on the basis of the so-called public key composed of the exponent e1 and of the modulo n1.

In a particular embodiment of the invention, the keys of the two modules A1 and A2 are identical, that is to say that on the encryption side, d1=d2 and n1=n2. By analogy, during decryption, e1=e2 and n1=n2. In this case, one speaks of the private key d, n and of the public key e, n.

Figure 3:
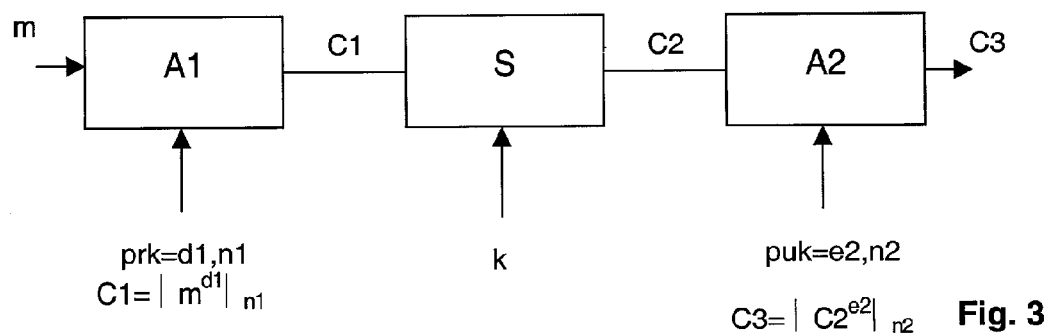
FIG. 3 represents an alternative to the encryption method
Figure 4:
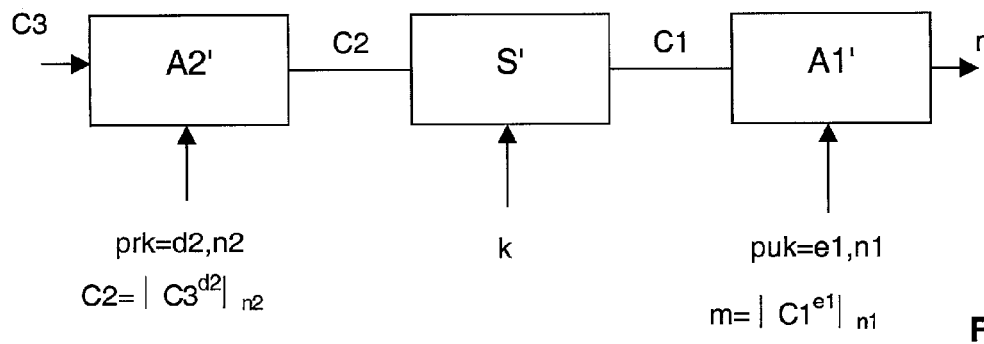
FIG. 4 represents an alternative to the decryption method.

In another embodiment of the invention, as illustrated in FIGS. 3 and 4, the module A2 uses the so-called public key instead of the so-called private key. At the moment of encryption, the public key e2, n2 is used by the module A2, (see FIG. 3) and during decryption (see FIG. 4), the module A2' uses the private key d2, n2 to operate. Although this configuration exhibits an overhead of work for the decryption set, the use of a private key reinforces the security offered by the module A2.

The example illustrated in FIGS. 3 and 4 is not restrictive in respect of other combinations. For example, it is possible to configure the module A1 so that it performs the encryption operation with the public key and the decryption with the private key.

It is also possible to replace the encryption/decryption module having secret key S with a module of the type with asymmetric keys of the same type as the modules A1 and A2.

The invention claimed is:

1. A method of encryption and decryption carried out by at least three encryption/decryption modules arranged in series, wherein each intermediate and the last encryption/decryption module begins encryption/decryption operations before the immediately preceding encryption/decryption module has terminated its encryption/decryption operation, wherein at least one encryption/decryption module operates with a type of encryption/decryption algorithm using asymmetric keys including a private key and a public key.

2. A method according to claim 1, wherein each intermediate and the last decryption module begins decryption operations as soon as said module receives a part of the results of decryption operations from the immediately preceding decryption module.

3. A method according to claim 1, wherein each intermediate and the last encryption module begins encryption operations as soon as said module receives a part of the results of encryption operations from the immediately preceding encryption module.

4. A method according to claim 1, wherein the method is carried out by three modules wherein the central module operates with a secret symmetric key.

5. A method according to claim 4, wherein the first module and the last module in respect of encryption and in reversed order the last module and the first module in respect of decryption operate with an algorithm using asymmetric keys including a private key and a public key.

6. A method according to claim 5, wherein the first module and the last module use the private key for encryption and the public key for decryption.

7. A method according to claim 6, wherein the first module and the last module use the same set of private and public keys.

8. A method according to claim 6, wherein the first module and the last module use a different set of private and public keys.

9. A method according to claim 5, wherein, the last module uses the public key during encryption and the first module uses the private key during decryption.

10. A method according to claim 1, wherein the method is carried out by three encryption/decryption modules, wherein all three modules operate with asymmetric keys.

11. A method of improving the security of an encryption/decryption process carried out by a plurality of decryption modules arranged in series, said method comprising the steps of:
 providing from a first and each intermediate encryption/decryption module partial results of an encryption/encryption operation to each intermediate and last encryption/decryption module, respectively;
 beginning, at each intermediate and last encryption/decryption module, encryption/decryption operations on said partially available result of an immediately preceding encryption/decryption module, before said immediately preceding encryption/decryption module has terminated its encryption/decryption operation;
 using asymmetric keys in the encryption/decryption process in at least one of said encryption/decryption modules, wherein said asymmetric keys including a private key and a public key.

12. A method according to claim 11, wherein said each intermediate and the last decryption module begins decryption operations upon receiving said partially available result from decryption operations of said immediately preceding decryption module.

13. A method according to claim 11, wherein each intermediate and the last encryption module begins encryption operations upon receiving said partially available result from encryption operations of said immediately preceding encryption module.

14. A method according to claim 11, wherein said series has three modules; further comprising the step of:

using a secret symmetric key in the encoding/decoding operations carried out by a central module.

15. A method according to claim 14, wherein the first module and the last module in respect of encryption and in reversed order the last module and the first module in respect of decryption operate with an algorithm using asymmetric keys, wherein said asymmetric keys include a private key and a public key.

16. A method according to claim 15, wherein the first module and the last module use said private key for encryption and said public key for decryption.

17. A method according to claim 16, wherein the first module and the last module use the same set of private and public keys.

18. A method according to claim 16, wherein the set of private and public keys used by said first module and said last module are different.

19. A method according to claim 15, wherein, the last module uses the public key during encryption and the first module uses the private key during decryption.

20. A method according to claim 11, wherein the series comprises three encryption/decryption modules, further comprising the step of using asymmetric keys in the encoding/decoding process of each of said three encryption/decryption modules.

* * * * *